Patented Feb. 2, 1943

2,310,038

UNITED STATES PATENT OFFICE 2,310,038

SULPHAMIC ACID COMPOUNDS AND PROCESS OF MAKING SAME

John B. Rust, Verona, N. J., assignor to Ellis-Foster Company, a corporation of New Jersey No Drawing. Application January 25, 1940, Serial No. 315,593

5 Claims. (Cl. 260—500)

The present invention relates to novel compounds of sulphamic acid. It is an object of this invention to provide new N-substituted derivatives of sulphamic acid which range from crystalline substances to resinous products.

The products of the present invention have many uses, some among them being physiologically active and others being useful as wetting agents, mordants, silk and wool weighting agents, permanent textile crease-proofing materials, insecticides, fungicides, permanent textile fire-proofing materials, lacquers and molding materials, and the like.

The products of the present invention are substituted sulphamato-methyl compounds and comprise the combination of amines (except tertiary amines), amides, phenols, ketones and the like with the grouping $(—CH_2NHSO_3)_nM$ wherein M is the cation of a metal, ammonia or an amine, and $n$ is an integer corresponding to the valence of M. The products may be prepared by the combination of the above methylol-reactive substances (that is, substances containing formaldehyde-replaceable hydrogen) with a methylol sulphamate $(HOCH_2—NHSO_3)_nM$, or by the reaction of a methylolamide, methylolamine, etc., with a sulphamate.

In the case of amine and amide reaction products the following structural formula would probably represent the materials formed:

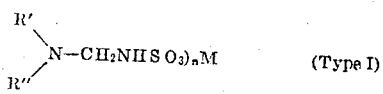  (Type I)

wherein M and $n$ have the same significance as above but R' and R" are hydrogen, or alkyl, acyl, alkylene or aromatic radicals and R' and R" together may constitute part of a heterocyclic group.

When phenols are employed in the process of the present invention materials are obtained which probably can be represented as:

  (Type II)

where M and $n$ have the same significance as above and R signifies that the phenol may be substituted. Thus, R may be hydrogen, alkyl, alkoxy, acetyl, p-tertiary amyl, isooctyl, stearoxy, halogen and the like.

In that case where ketones are employed the structural formula may be given as

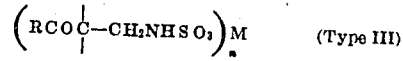  (Type III)

wherein M and $n$ have the same significance as above and

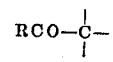

represents the residue of a ketone having at least one methylol-replaceable H.

The above description gives a general illustration of the present invention. These formulas may be combined into one which is more general: $(A—CH_2NHSO_3)_nM$ wherein A represents

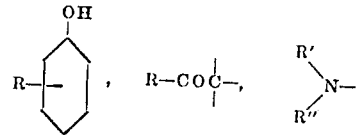

or, in general, the residue of a methylol-reactive compound selected from the group consisting of amides, amines, phenols and ketones.

It has also been found that compounds having the general formula

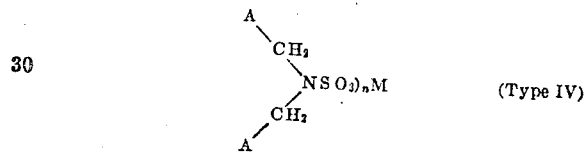  (Type IV)

may be made in which A has the same significance as above.

It is a further object of the present invention to provide resinous or resin-like materials which essentially have the same structure as the above materials and are in reality special cases of the above described general cases. For instance, in Formula I if R' is $HOCH_2NHCO—$ and R" hydrogen it is possible to obtain a resinous material useful as a textile crease-proofing material and which at the same time acts as a fire-proofing material. If a modification of Formula IV is made it is possible to obtain materials which could probably be represented as:

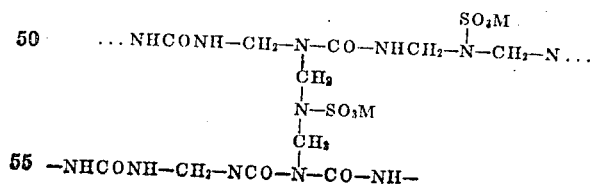

($n$ of the general formula is omitted for simplicity).

It is obvious to those skilled in the art that numerous modifications of the above described materials may be made. The following are examples given to illustrate the products and process of the present invention. All proportions are in parts by weight.

EXAMPLE 1.—*Calcium sulphamate resin.*—To 155 parts of a 33½% aqueous solution of calcium sulphamate, 27 parts of a 37½% formaldehyde solution were added and the solution gently warmed. The reaction was considered finished when the solution no longer reduced ammoniacal silver nitrate. It was then evaporated down to remove the water, resulting in a hard brittle resin which softened but did not fuse and which decomposed at high heating temperatures.

EXAMPLE 2.—*Calcium sulphamate-urea resin.*—81 parts of a 50% aqueous solution of calcium sulphamate were mixed with 30 parts of urea and 80 parts of 37½ aqueous formaldehyde solution. The clear solution which resulted was allowed to remain at room temperature, cooling to counteract the exothermic reaction which occurred. In several hours a white precipitate came down. This was insoluble in cold water but nearly completely soluble in boiling water. By warming the white precipitate with the mother liquor a hazy solution was formed. This was diluted with water to give a solution of 15% solids and cotton muslin was impregnated with the solution. The cloth was squeezed until it weighed twice its original weight and heated at 60° C. for 30 minutes. After soaping the fabric and drying it was found to possess distinct crease-resistant properties.

EXAMPLE 3.—*Zinc sulphamate-urea resin.*—The following mixtures were made up and allowed to stand in a water bath at room temperature:

|   | 39.2% zinc sulfamate solution | Urea | 37½% formaldehyde solution |
|---|---|---|---|
|   | Parts | Parts | Parts |
| A | 72.5 | 20.0 | 53.3 |
| B | 55 | 20.0 | 53.3 |
| C | 36.5 | 20.0 | 53.3 |
| D | 27.5 | 20.0 | 53.3 |
| E | 14.0 | 20.0 | 53.3 |

In four hours clouding had occurred with E. In about 6 hours E was solid and opaque. In 24 hours A had clouded but with A through C the precipitate which came down was soluble in the mother liquor when warmed.

These materials may be heated to obtain insoluble, infusible resins of which the zinc sulphamate is an integral part.

EXAMPLE 4.—*Morpholine sulphamate-urea resin.*—The following compositions were made up and allowed to react by remaining at room temperature in a water bath.

|   | Urea | 37½% formaldehyde solution | 48% morpholine sulfamate solution |
|---|---|---|---|
|   | Parts | Parts | Parts |
| A | 20 | 53.3 | 128 |
| B | 20 | 53.3 | 64 |
| C | 20 | 53.3 | 32 |
| D | 20 | 53.3 | 16 |

Solution D started to cloud over in 4½ hours whereas solution A was stable for over one month.

As a base morpholine is monovalent whereas zinc (used in Example 3) is divalent. This fact may explain to some extent the greater stability of the morpholine sulphamate-urea resin solutions.

EXAMPLE 5.—*Silver sulphamate-urea resin.*—Silver sulphamate was made from silver carbonate and sulphamic acid. It was very readily soluble in water. To a solution of silver sulphamate in water about twenty times its weight of urea dissolved in a 37½% formaldehyde solution was added. The proportion of urea to formaldehyde was one mole to 1½ moles. On allowing the material to remain at a slightly elevated temperature for several hours a voluminous white precipitate came down. This was washed thoroughly with water and then treated with a solution of pyrogallol. The powder immediately turned black from the silver reduced in the resin.

By using silver sulphamate in this manner with formaldehyde-amide and amine reaction products and carrying out the reaction in the dark a photosensitive material is obtained which has many industrial uses.

EXAMPLE 6.—*Ammonium sulphamato-methyl diisobutyl phenol.*—430 parts of a 72.6% aqueous solution of ammonium sulphamate were mixed with 220 parts of a 37½% formaldehyde solution. A rather violent exothermic reaction started which continued for about 40 minutes. On cooling the solution a large crop of crystals was obtained of methylolammonium sulphamate. 51 parts of diisobutyl phenol were mixed with 36 parts of methylolammonium sulphamate, 20 parts of acetic acid and 50 parts of water. The mixture was refluxed for about five hours and cooled. The aqueous layer on cooling formed a gelatinous mass which was evidently

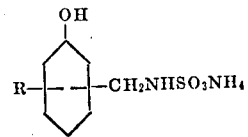

R=diisobutyl

EXAMPLE 7.—*Morpholine sulphamatomethyl sulphanilamide.*—18.4 parts of morpholine sulphamate were dissolved in 30 parts of dioxan and 8 parts of 37½% formaldehyde. 17.2 parts of sulphanilamide dissolved in 40 parts of ethanol were added to the above solution and the resulting solution heated under a reflux for 2 hours. On cooling and adding a small portion of water a semi-crystalline mass precipitated. This material exhibited greater solubility in water than the sulphanilamide.

Materials such as that described above are derivatives of sulphanilamide which is known to possess physiological activity.

EXAMPLE 8.—*Morpholine sulphamatomethyl p-chlorophenol.*—36.8 parts of morpholine sulphamate and 73 parts of ethanol were mixed with 16 parts of 37½% aqueous formaldehyde and 25.6 parts of p-chlorophenol. The clear solution which resulted was warmed to 60–70° C. for 30 minutes, then allowed to remain at room temperature for 20 hours. Upon evaporation of the alcohol a viscous oil resulted which was soluble in water.

This chlorinated phenol derivative could be used for rendering textiles moth-repellent and for proofing material against mildew and the like.

EXAMPLE 9.—*Morpholine sulphamatomethyl aniline.*—87 parts of morpholine sulphamate and 40 parts of aqueous 37½% formaldehyde solution were refluxed together for 15 minutes. A clear, light colored syrup was obtained. 46.6 parts of aniline were then added and refluxing continued for about 3 hours. The reaction product was warmed under reduced pressure to dehydrate. A light colored, granular, wax-like product was obtained. This was insoluble in alcohol, 50% alcohol-water, benzene, 10% aqueous sodium hydroxide. However, it was soluble in water and dilute hydrochloric acid.

EXAMPLE 10.—*Zinc sulphamatomethyl acetone.*—80.7 parts of zinc sulphamate, 80 parts of aqueous 37½% formaldehyde and 58 parts of acetone were gently refluxed together on a water bath for approximately 6 hours. While refluxing two layers separated. The water was removed by gently warming under reduced pressure. A light colored, granular product separated which was air-dried. The reaction product was insoluble in alcohol and benzol. However, it was soluble in water, 50% alcohol-water. It was partially soluble in 10% aqueous sodium hydroxide.

EXAMPLE 11.—*Morpholine sulphamatomethyl morpholine.*—37 parts of morpholine sulphamate, 43.5 parts of morpholine, and 40 parts of an aqueous 37½% formaldehyde solution were gently refluxed together on a water bath for 2 hours. Two aqueous layers separated. After warming under reduced pressure, the reaction product was allowed to stand in an ice box overnight. A light colored, crystalline product was obtained which was insoluble in alcohol, 50% alcohol-water, benzol, and dilute aqueous hydrochloric acid. However, it was soluble in water. This material would be useful as a textile softening compound and as a lubricant.

The materials of the present invention have a very wide variety of uses since their range of properties is large, some being crystalline derivatives and others being hard resinous masses. Some of the resins are heat-hardenable and may be made into molding compositions when mixed with fillers. If the heavier metals such as lead are employed the moldings have considerable weight. This is at times an advantage as for instance molded cigarette trays, boxes and the like. The above examples should not be construed as limiting the scope of the present invention since those skilled in the art will realize that many variations may be made without departing from the spirit of the invention. The structural formulae which were given above are only an attempt to explain the present invention, other explanations possibly being admissible.

What I claim is:

1. The process which comprises reacting a neutral salt of sulphamic acid with formaldehyde and a nitrogen compound selected from the group consisting of primary amines of the benzene series, monocyclic N-heterocyclic amines and urea.

2. The process which comprises reacting a neutral salt of sulphamic acid with formaldehyde to form a formaldehyde-sulphamate compound, and thereafter reacting said formaldehyde-sulphamate compound with a nitrogen compound selected from the group consisting of primary amines of the benzene series, monocyclic N-heterocyclic amines and urea.

3. The process which comprises reacting a neutral salt of sulphamic acid with formaldehyde to form the methylol derivative thereof and thereafter reacting said methylol derivative with urea.

4. The process which comprises reacting a neutral salt of sulphamic acid with formaldehyde to form the methylol derivative thereof and thereafter reacting said methylol derivative with a primary amine of the benzene series.

5. A reaction product of the general formula $(A-CH_2NHSO_3)_nM$, wherein A is a nitrogen-containing group joined to methylene through an N-atom and selected from the class consisting of primary amines of the benzene series, monocyclic N-heterocyclic amines and urea, M is an ion selected from the group consisting of metals, ammonia and amines, and $n$ is an integer corresponding to the valence of M.

JOHN B. RUST.

DISCLAIMER 2,310,038.—*John B. Rust*, Verona, N. J. Sulphamic Acid Compounds and Process of Making Same. Patent dated February 2, 1943. Disclaimer filed February 25, 1944, by the assignee, *Ellis-Foster Company*.

Hereby enters this disclaimer to claim 3.

[*Official Gazette March 28, 1944.*]